US012362446B2

(12) United States Patent
Su et al.

(10) Patent No.: US 12,362,446 B2
(45) Date of Patent: Jul. 15, 2025

(54) BATTERY CELL, BATTERY, POWER CONSUMPTION DEVICE, AND DEVICE FOR MANUFACTURING BATTERY CELL

(71) Applicant: CONTEMPORARY AMPEREX TECHNOLOGY (HONG KONG) LIMITED, Hong Kong (CN)

(72) Inventors: Huasheng Su, Ningde (CN); Chengyou Xing, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 568 days.

(21) Appl. No.: 17/938,947

(22) Filed: Sep. 7, 2022

(65) Prior Publication Data
US 2023/0033282 A1 Feb. 2, 2023

Related U.S. Application Data

(63) Continuation of application No. PCT/CN2021/109910, filed on Jul. 30, 2021.

(51) Int. Cl.
*H01M 50/593* (2021.01)
*H01M 10/04* (2006.01)
(Continued)

(52) U.S. Cl.
CPC ..... *H01M 50/593* (2021.01); *H01M 10/0404* (2013.01); *H01M 10/0422* (2013.01);
(Continued)

(58) Field of Classification Search
CPC .................................................. H01M 50/593
See application file for complete search history.

(56) References Cited

U.S. PATENT DOCUMENTS

2005/0244706 A1* 11/2005 Wu ................... H01M 50/3425
429/185
2011/0183164 A1 7/2011 Wu et al.

FOREIGN PATENT DOCUMENTS

CN 107248595 A 10/2017
CN 110034326 A 7/2019
(Continued)

OTHER PUBLICATIONS

Chinese Notification to Grant Patent Right issued Dec. 1, 2021, in corresponding Chinese Application No. 202121777613.8, 2pp.
(Continued)

*Primary Examiner* — Brian R Ohara
(74) *Attorney, Agent, or Firm* — XSENSUS LLP

(57) ABSTRACT

Embodiments of the present disclosure provide a battery cell, a battery, a power consumption device, and a device and a method for manufacturing a battery cell. The battery cell may comprise an electrode assembly, a housing, an end cover, and a first insulation structure. The electrode assembly may comprise a first tab. The housing may accommodate the electrode assembly, the housing may have an opening, and a first limiting structure may be formed on an inner circumferential wall of the housing. The end cover may cover the opening, and in a thickness direction of the end cover, the first limiting structure may limit movement of the end cover in a direction towards the electrode assembly. The first insulation structure may be at least partially provided between the first tab and the first limiting structure, so as to insulate and isolate the first tab from the first limiting structure.

14 Claims, 7 Drawing Sheets

(51) Int. Cl.
  *H01M 50/107* (2021.01)
  *H01M 50/152* (2021.01)
  *H01M 50/184* (2021.01)
  *H01M 50/186* (2021.01)
  *H01M 50/213* (2021.01)
  *H01M 50/531* (2021.01)
  *H01M 50/586* (2021.01)

(52) U.S. Cl.
  CPC ....... *H01M 50/107* (2021.01); *H01M 50/152* (2021.01); *H01M 50/184* (2021.01); *H01M 50/186* (2021.01); *H01M 50/213* (2021.01); *H01M 50/531* (2021.01); *H01M 50/586* (2021.01); *H01M 2220/20* (2013.01)

(56) References Cited

FOREIGN PATENT DOCUMENTS

| CN | 210743995 U | 6/2020 | | |
|---|---|---|---|---|
| CN | 112310574 A | 2/2021 | | |
| JP | 2012-038705 A | 2/2012 | | |
| JP | 2014-222670 A | 11/2014 | | |
| JP | 2015-156375 A | 8/2015 | | |
| JP | 2020-074290 A | 5/2020 | | |
| KR | 20130052407 A | * | 5/2013 | .......... H01M 50/107 |
| WO | 2018/225394 A1 | 12/2018 | | |
| WO | 2019/148662 A1 | 8/2019 | | |
| WO | 2019/153459 A1 | 8/2019 | | |
| WO | 2021/023060 A1 | 2/2021 | | |
| WO | 2021/029115 A1 | 2/2021 | | |
| WO | WO-2021020235 A1 | * | 2/2021 | ........ H01M 10/0422 |

OTHER PUBLICATIONS

International Search Report and Written Opinion of The International Searching Authority issued Mar. 25, 2022 in corresponding International Application No. PCT/CN2021/109910, 14pp.

Extended European search report issued on Oct. 13, 2023, in corresponding European patent Application No. 21927052.7, 6 pages.

Office Action issued on Oct. 3, 2023, in corresponding Japanese patent Application No. 2022-549692, 9 pages.

Notice of Grant issued on Oct. 25, 2023, in corresponding Chinese patent Application No. 202180006371.9, 8 pages.

* cited by examiner

2000

BATTERY CELL, BATTERY, POWER CONSUMPTION DEVICE, AND DEVICE FOR MANUFACTURING BATTERY CELL

CROSS REFERENCE TO RELATED APPLICATION

The present application is a continuation of International Application No. PCT/CN2021/109910, filed Jul. 30, 2021, the entire content of which is incorporated herein by reference in its entirety.

TECHNICAL FIELD

The present disclosure relates to the technical field of batteries, and specifically to a battery cell, a battery, a power consumption device, and a device and a method for manufacturing a battery cell.

BACKGROUND ART

At present, the batteries mostly used by vehicles are generally lithium-ion batteries. As a rechargeable battery, the lithium-ion batteries have the advantages such as a small volume, a high energy density, a high power density, lots of cycles, and long storage time.

The rechargeable battery generally includes a housing, an end cover, and an electrode assembly, wherein the end cover is provided to cover the housing and provides a closed space for the electrode assembly and an electrolyte, and electric energy of the electrode assembly can be led out of the housing through an electrode terminal of the end cover.

In order to ensure the electrical safety and the electrical performance of the battery, various structures of the battery should be well insulated from each other, so as to reduce the risks of electricity leakage and internal short circuit of the battery.

Therefore, how to realize better insulation between various structures of the battery is an urgent problem to be solved in the battery technology.

SUMMARY

Embodiments of the present disclosure provide a battery cell, a battery, a power consumption device, and a device and a method for manufacturing a battery cell, so as to solve the problem of poor insulating property of the existing battery cells.

In a first aspect, an embodiment of the present disclosure provides a battery cell, including an electrode assembly, a housing, an end cover, and a first insulation member or structure. The electrode assembly includes a first tab. The housing is configured to accommodate the electrode assembly, the housing has an opening, and a first limiting portion or structure is formed on an inner circumferential wall of the housing. The end cover is configured to cover the opening, and in a thickness direction of the end cover, the first limiting portion is configured to limit movement of the end cover in a direction towards the electrode assembly. The first insulation member is at least partially provided between the first tab and the first limiting portion, so as to insulate and isolate (isolate in an insulated manner) the first tab from the first limiting portion.

In the above technical solution, in the thickness direction of the end cover, at least a part of the first insulation member is provided between the first tab and the first limiting portion, so as to insulate and isolate the first tab from the first limiting portion, and reduce the risk of safety problem caused by short circuit inside the battery cell due to electrical connection formed between the first tab and the first limiting portion caused by contact of the first tab with the first limiting portion as the first tab becomes loose towards the end cover.

In some embodiments of the first aspect, the first insulation member is attached to an end surface of the first tab facing the end cover.

In the above technical solution, the first insulation member is attached to a surface of the first tab facing the end cover, so that the first insulation member always forms insulation and isolation (insulated isolation) between the first tab and the first limiting portion.

In some embodiments of the first aspect, the battery cell further includes a second insulation member or structure, the second insulation member is configured to isolate the end cover from the housing, the second insulation member includes an abutment body extending in the direction towards the electrode assembly, and the abutment body is configured to abut against the first insulation member, so that at least a part of the first insulation member is held between the first tab and the first limiting portion.

In the above technical solution, the abutment of the abutment body of the second insulation member against the first insulation member can make at least a part of the first insulation member to be held between the first tab and the first limiting portion, so that the first tab and the first limiting portion are insulated and isolated by the first insulation member, reducing the risk that the first tab cannot be insulated and isolated from the first limiting portion caused by movement of the first insulation member between the first tab and the first limiting portion.

In some embodiments of the first aspect of the present disclosure, in the thickness direction of the end cover, the abutment body exceeds the first limiting portion in the direction facing the electrode assembly.

In the above technical solution, the abutment body exceeds the first limiting portion in the direction facing the electrode assembly in the thickness direction of the end cover, then when the abutment body abuts against the first insulation member, a gap always exists between the first insulation member and the first limiting portion, so that there is a gap between the first tab and the first limiting portion in the thickness direction, further reducing the risk of contact between the first tab and the first limiting portion.

In some embodiments of the first aspect of the present disclosure, the abutment body is of an annular structure.

In the above technical solution, as the abutment body is of an annular structure, an abutment area between the abutment body and the first insulation member can be increased.

In some embodiments of the first aspect of the present disclosure, the second insulation member further includes a first insulator connected to the abutment body, the first insulator is configured to isolate the end cover and the housing, and the abutment body extends from the first insulator in the direction towards the electrode assembly, so as to abut against the first insulation member.

In the above technical solution, the abutment body extends in the direction towards the electrode assembly, so that an abutment force of the abutment portion or structure against the first insulation member is perpendicular to a plane where the first tab is located, the abutment against the first insulation member is more reliable, moreover, as the abutment body extends in the direction towards the electrode assembly, an extending path of the abutment body is the shortest, so that the abutment portion occupies the smallest space inside the battery cell.

In some embodiments of the first aspect of the present disclosure, the first insulator includes a first insulation portion or structure and a second insulation portion or structure that are connected; the end cover includes a body portion or structure and an extension portion or structure provided along an edge of the body portion, the second insulation portion is located between an outer circumferential wall of the extension portion and the inner circumferential wall of the housing, and in the thickness direction of the end cover, the first insulation portion is located between the first limiting portion and the extension portion, and the abutment body is connected to the first insulation portion.

In the above technical solution, the first insulator includes a first insulation portion or structure and a second insulation portion or structure that are connected, not only the insulation and isolation between the end cover and the first limiting portion can be realized, but also the insulation between the end cover and the housing can be realized.

In some embodiments of the first aspect of the present disclosure, the first insulator further includes a third insulation portion or structure; and the third insulation portion is connected to the second insulation portion, and in the thickness direction of the end cover, the first insulation portion and the third insulation portion are located at two sides of the end cover, respectively.

In the above technical solution, the first insulator further includes the third insulation portion, the third insulation portion can form insulated protection on a side of the end cover facing away from the first insulation portion in the thickness direction, further reducing the risk of short circuit inside the battery cell.

In some embodiments of the first aspect of the present disclosure, the housing has a second limiting portion or structure; and in the thickness direction of the end cover, the third insulation portion is located between the extension portion and the second limiting portion, and the second limiting portion and the first limiting portion are configured to jointly limit the movement of the end cover relative to the housing in the thickness direction of the end cover.

In the above technical solution, the second limiting portion and the first limiting portion cooperate to jointly limit the movement of the end cover relative to the housing in the thickness direction of the end cover, so that the end cover and the housing maintain a stable connection relationship.

In some embodiments of the first aspect of the present disclosure, the second limiting portion is a flanging structure of the housing folded inwards at the position of the opening.

In the above technical solution, the second limiting portion is a flanging structure of the housing folded inwards at the position of the opening, that is, the second limiting portion is a part of the housing, so that the second limiting portion can stably limit the end cover on the side of the end cover facing away from the electrode assembly. Moreover, as the second limiting portion is a part of the housing, the connection relationship of the housing also can be reduced, thus improving the structural strength of the housing.

In some embodiments of the first aspect of the present disclosure, the battery cell further includes a sealing member or structure, and the end cover is in sealed connection with the housing through the sealing member.

In the above technical solution, the end cover is in sealed connection with the housing through the sealing member, so that the end cover, the housing, and the sealing member jointly form a closed space for accommodating the electrode assembly and the electrolyte, and reduces the risk of liquid leakage.

In some embodiments of the first aspect of the present disclosure, the sealing member is the second insulation member or structure.

In the above technical solution, the sealing member is the second insulation member, so that the second insulation member not only functions to insulate and isolate the end cover from the housing, but also can have a sealing effect between the end cover and the housing, then it is unnecessary to additionally provide a sealing member between the end cover and the housing, thus reducing occupation of the internal space of the housing, and facilitating improving the energy density.

In some embodiments of the first aspect of the present disclosure, a first concave portion or structure recessed inward from an outer circumferential wall of the housing is formed on the housing, the first limiting portion protruding from the inner circumferential wall of the housing is formed at a position of the housing corresponding to the first concave portion, and the first concave portion and the first limiting portion are both of annular structures.

In the above technical solution, forming the first limiting portion on the inner wall of the housing is relatively difficult to process, while forming the first concave portion on the outer circumferential wall of the housing is less difficult than forming the first limiting portion directly on the inner circumferential wall of the housing, therefore, the difficulty in shaping the first limiting portion is reduced by forming the first limiting portion that protrudes from the inner circumferential wall of the housing at a position of the housing corresponding to the first concave portion.

In some embodiments of the first aspect of the present disclosure, the electrode assembly further includes a main body portion or structure, and the first tab protrudes from an end of the main body portion facing the end cover; the first insulation member further includes a second insulator and a third insulator, the second insulator is provided between the first tab and the first limiting portion, the third insulator is connected to the second insulator, and the third insulator is provided in a manner of surrounding an outer periphery of the main body portion, so as to separate the main body portion and the housing.

In the above technical solution, the second insulator is provided between the first tab and the first limiting portion, so that the first tab is insulated and isolated from the first limiting portion, and the third insulator is connected to the second insulator and provided in a manner of surrounding the outer periphery of the main body portion, so as to insulate and isolate the main body portion and the housing, and prevent short circuit inside the battery cell, moreover, the third insulator is connected to the second insulator and provided in a manner of surrounding the outer periphery of the main body portion, then it is convenient to mount and fix the first insulation member.

In some embodiments of the first aspect of the present disclosure, the third insulator and the second insulator are of an integrally formed structure.

In the above technical solution, the third insulator and the second insulator are of an integrally formed structure, then it is convenient to manufacture the first insulation member, and the structural strength of the first insulation member can be improved.

In a second aspect, an embodiment of the present disclosure provides a battery, including a plurality of battery cells provided according to the embodiments of the first aspect.

In the above technical solution, the first insulation member is provided between the first tab and the first limiting portion of the housing of the battery cell, so as to insulate and isolate the first tab from the first limiting portion, and reduce the risk of safety problem caused by short circuit inside the battery cell due to electrical connection formed between the first tab and the first limiting portion caused by contact of the first tab with the first limiting portion as the first tab becomes loose towards the end cover.

In a third aspect, an embodiment of the present disclosure provides a power consumption device, including the battery provided according the embodiments of the second aspect.

In the above technical solution, the first insulation member is provided between the first tab and the first limiting portion of the battery, so as to insulate and isolate the first tab from the first limiting portion, and reduce the risk of safety problem caused by short circuit inside the battery due to electrical connection formed between the first tab and the first limiting portion caused by contact of the first tab with the first limiting portion as the first tab becomes loose towards the end cover, and improve the electrical safety.

In a fourth aspect, an embodiment of the present disclosure provides a device for manufacturing a battery cell, including a providing apparatus and an assembling apparatus. The providing apparatus is configured to provide an electrode assembly, a housing, an end cover, and a first insulation member; the electrode assembly includes a first tab, the housing has an opening, a first limiting portion is formed on an inner circumferential wall of the housing, the end cover is configured to cover the opening, and in a thickness direction of the end cover, the first limiting portion is configured to limit movement of the end cover in a direction towards the electrode assembly; the assembling apparatus is configured to assemble the electrode assembly, the housing, the end cover, and the first insulation member, so that the housing accommodates the electrode assembly, the end cover covers the opening, and at least a part of the first insulation member is provided between the first tab and the first limiting portion, so as to insulate and isolate the first tab and the first limiting portion.

In the above technical solution, the assembling apparatus can provide, in the thickness direction of the end cover, at least a part of the first insulation member between the first tab and the first limiting portion, so as to insulate and isolate the first tab from the first limiting portion, and reduce the risk of safety problem caused by short circuit inside the battery cell due to electrical connection formed between the first tab and the first limiting portion caused by contact of the first tab with the first limiting portion as the first tab becomes loose towards the end cover.

In a fifth aspect, an embodiment of the present disclosure provides a method for manufacturing a battery cell, including:
providing an electrode assembly, a housing, an end cover, and a first insulation member, wherein
the electrode assembly includes a first tab, the housing has an opening, a first limiting portion is formed on an inner circumferential wall of the housing, the end cover is configured to cover the opening, and in a thickness direction of the end cover, the first limiting portion is configured to limit movement of the end cover in a direction towards the electrode assembly; and
assembling the electrode assembly, the housing, the end cover, and the first insulation member, so that the housing accommodates the electrode assembly, the end cover covers the opening, and at least a part of the first insulation member is provided between the first tab and the first limiting portion, so as to insulate and isolate the first tab and the first limiting portion.

In the above technical solution, in the thickness direction of the end cover, at least a part of the first insulation member is provided between the first tab and the first limiting portion, so as to insulate and isolate the first tab from the first limiting portion, and reduce the risk of safety problem caused by short circuit inside the battery cell due to electrical connection formed between the first tab and the first limiting portion caused by contact of the first tab with the first limiting portion as the first tab becomes loose towards the end cover.

BRIEF DESCRIPTION OF DRAWINGS

In order to more clearly illustrate technical solutions of embodiments of the present disclosure, accompanying drawings which need to be used in the embodiments are introduced briefly below. It should be understood that the accompanying drawings below merely show some embodiments of the present disclosure, and thus should not be considered as limitation to the scope. Those ordinarily skilled in the art still could obtain other relevant accompanying drawings according to these accompanying drawings, without using any creative effort.

DETAILED DESCRIPTION OF EMBODIMENTS

Figure 1:
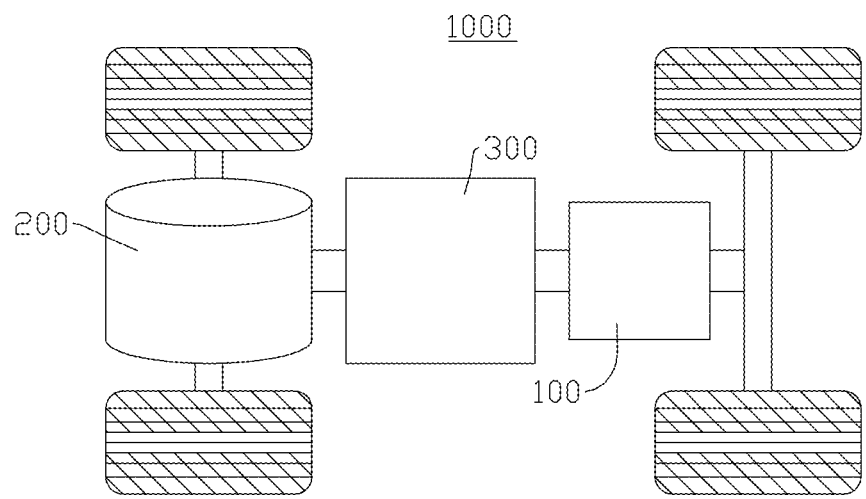
FIG. 1 is a structural schematic view of a vehicle provided in some embodiments of the present disclosure.

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, the embodiments described are some but not all embodiments of the present disclosure. Generally, components in the embodiments of the present disclosure described and shown in the accompanying drawings herein may be arranged and designed in various different configurations.

Therefore, the detailed descriptions below of the embodiments of the present disclosure provided in the accompanying drawings are not intended to limit the claimed scope of the present disclosure, but merely illustrate chosen embodiments of the present disclosure. Based on the embodiments in the present disclosure, all of other embodiments, obtained by those ordinarily skilled in the art without any creative effort, shall fall within the scope of protection of the present disclosure.

It should be noted that the embodiments and the features in the embodiments of the present disclosure may be combined with each other without conflict.

It should be noted that similar reference signs and letters represent similar items in the following accompanying drawings, therefore, once a certain item is defined in one accompanying drawing, it is not needed to be defined or explained in subsequent accompanying drawings.

In the descriptions of the embodiments of the present disclosure, it should be noted that orientation or positional relationships indicated are based on orientation or positional relationships as shown in the accompanying drawings, or orientation or positional relationships of a product of the present disclosure when being conventionally placed in use, or orientation or positional relationships conventionally understood by those skilled in the art, merely for facilitating describing the present disclosure and simplifying the descriptions, rather than indicating or suggesting that related devices or elements have to be in the specific orientation or configured and operated in a specific orientation, therefore, they should not be construed as limitation to the present disclosure. Besides, terms such as "first", "second", and "third" are merely for distinguishing the descriptions, but should not be construed as indicating or implying importance in the relativity.

The term "a plurality of" appearing in the present disclosure means two or more (including two).

In the present disclosure, the battery cells may include lithium-ion secondary batteries, lithium-ion primary batteries, lithium-sulfur batteries, sodium/lithium-ion batteries, sodium-ion batteries or magnesium-ion batteries, etc., which is not limited in the embodiments of the present disclosure. The battery cells may be cylindrical, flat, cuboid or in other shapes, which is not limited in the embodiments of the present disclosure, either. The battery cells are generally divided into three types according to the way of encapsulating: cylindrical battery cells, prismatic battery cells, and pouch battery cells, which is not limited in the embodiments of the present disclosure, either.

The battery mentioned in the embodiments of the present disclosure refers to a single physical module that includes one or more battery cells to provide a higher voltage and capacity. For example, the battery mentioned in the present disclosure may include a battery module or a battery pack, etc. The battery generally includes a case for encapsulating one or more battery cells. The case can prevent liquids or other foreign matters from affecting the charging or discharging of the battery cell.

The battery cell includes an electrode assembly and an electrolytic solution, and the electrode assembly is composed of a positive electrode plate, a negative electrode plate, and a separator. The operation of the battery cell mainly relies on movement of metal ions between the positive electrode plate and the negative electrode plate. The positive electrode plate includes a positive electrode current collector and a positive active material layer, the positive active material layer is coated on a surface of the positive electrode current collector, the current collector not coated with the positive active material layer protrudes from the positive electrode current collector coated with the positive active material layer, and the positive electrode current collector not coated with the positive active material layer is used as a positive electrode tab. Taking the lithium-ion battery as an example, a material of the positive electrode current collector may be aluminum, and the positive active material may be lithium cobaltate, lithium iron phosphate, ternary lithium or lithium manganate, etc. The negative electrode plate includes a negative electrode current collector and a negative active material layer, the negative active material layer is coated on a surface of the negative electrode current collector, the negative electrode current collector not coated with the negative active material layer protrudes from the negative electrode current collector coated with the negative active material layer, and the negative electrode current collector not coated with the negative active material layer is used as a negative electrode tab. A material of the negative electrode current collector may be copper, and the negative active material may be carbon or silicon, etc. In order to ensure that no fusing occurs when a large current passes, a plurality of positive electrode tabs are provided and stacked together, and a plurality of negative electrode tabs are provided and stacked together. A material of the separator may be PP (polypropylene), PE (polyethylene), or the like. The electrode assembly may be of a winding structure.

For the development of the battery technology, various design factors, for example, energy density, cycle lifetime, discharge capacity, C-rate and other performance parameters, need to be considered at the same time, and in addition, the safety of the battery should also be taken into consideration.

For the battery cell, one of the main safety problems is short circuit inside the battery cell. After the positive electrode and the negative electrode of the electrode assembly of the battery cell are electrically connected, the battery cell is short-circuited, and the short circuit of the battery cell may cause safety problems such as liquid leakage, explosion, and spontaneous combustion. The reasons for causing the internal short circuit of the battery cell are relatively complex, for example, manufacturing reasons or improper manufacturing processes, so that surfaces of the positive electrode plate and/or the negative electrode plate have burrs, and the burrs pierce the separator to cause short circuit of the positive and negative electrodes. For another example, the battery cell is too hot during use, and the separator is melted to cause short circuit. A further quite important reason is that contact of the tab with the housing of the battery cell causes failure.

In the prior art, the battery cell includes an electrode assembly, a housing, and an end cover. The electrode assembly includes a first tab located at one end in an axial direction. The housing is configured to accommodate the electrode assembly. The housing has an opening, and a first limiting portion is formed on an inner circumferential wall of the housing. The end cover is configured to cover the opening. In the thickness direction of the end cover, the first limiting portion is configured to limit the movement of the end cover in a direction towards the electrode assembly, and the first tab is configured to be electrically connected to the end cover. In order to facilitate welding the first tab and reducing an axial dimension of the electrode assembly, the first tab is kneaded flat in the axial direction of the electrode assembly, but the inventors found that the first tab kneaded flat is not fixed, and an elastic force accumulated in the kneading process will make the first tab loose towards the end cover, and finally the first tab may come into contact with the first limiting portion, thus causing short circuit inside the battery cell.

In view of this, an embodiment of the present disclosure provides a technical solution. By providing at least a part of a first insulation member between the first tab and the first limiting portion along a thickness direction of the end cover, and insulating and isolating the first tab from the first limiting portion through the first insulation member, the risk of short circuit inside the battery cell caused by the fact that the first tab is lapped with the first limiting portion due to loosening of the first tab towards the end cover is reduced.

The technical solutions described in the embodiments of the present disclosure are applicable to batteries and power consumption devices using the batteries.

The power consumption device may be vehicles, mobile phones, portable apparatuses, notebook computers, ships, spacecrafts, electric toys, electric tools, etc. The vehicles can be a fuel-powered vehicle, a gas-powered vehicle or a new-energy vehicle, and the new-energy vehicle may be a battery electric vehicle, a hybrid electric vehicle or an extended-range vehicle, etc.; the spacecrafts include airplanes, rockets, space shuttles, spaceships, etc.; the electric toys include stationary or movable electric toys, for example, game machines, electric automobile toys, electric ship toys, electric plane toys, etc.; the electric tools include metal cutting electric tools, grinding electric tools, assembling electric tools, and railway electric tools such as electric drills, electric grinders, electric spanners, electric screwdrivers, electric hammers, electric impact drills, concrete vibrators, electric grooves etc. The embodiments of the present disclosure do not impose special restrictions on the foregoing power consumption devices.

For convenience of description, the following embodiments are described by taking an example in which the power consumption device is a vehicle.

Referring to FIG. 1, FIG. 1 is a structural schematic view of a vehicle 1000 provided in some embodiments of the present disclosure. The vehicle 1000 is provided therein with a battery 100, and the battery 100 may be provided at the bottom or the head or the tail of the vehicle 1000. The battery 100 may be used to supply power to the vehicle 1000, for example, the battery 100 can be used as an operation power supply of the vehicle 1000.

The vehicle 1000 further may include a controller 200 and a motor 300, wherein the controller 200 is configured to control the battery 100 to supply power to the motor 300, for example, for a working power demand of the vehicle 1000 during startup, navigation, and running.

In some embodiments of the present disclosure, the battery 100 may be used not only as an operation power supply for the vehicle 1000 but also as a driving power supply for the vehicle 1000, replacing or partially replacing fuel or natural gas to provide driving power for the vehicle 1000.

Figure 2:
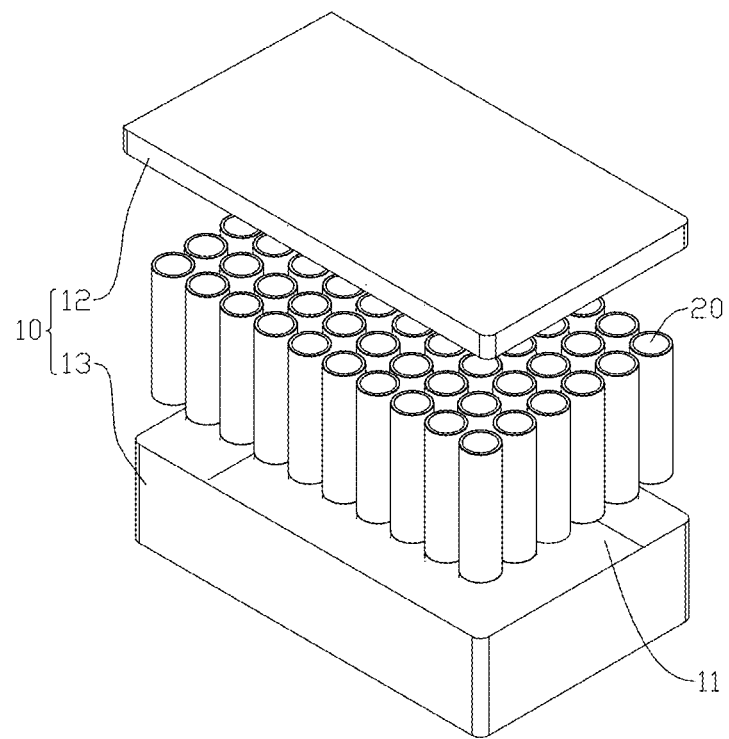
FIG. 2 is a structural schematic view of a battery provided in some embodiments of the present disclosure.

Referring to FIG. 2, FIG. 2 is a structural schematic view of the battery 100 provided in some embodiments of the present disclosure. The battery 100 includes a case 10 and battery cells 20, and the battery cells 20 are accommodated in the case 10.

The case 10 is configured to provide an accommodating space 11 for the battery cells 20. In some embodiments, the case 10 may include a first part 12 and a second part 13, and the first part 12 and the second part 13 cover each other, so as to define the accommodating space 11 for accommodating the battery cells 20. Without doubt, a joint between the first part 12 and the second part 13 may be sealed by a sealing member (not shown in the drawings), and the sealing member may be a sealing ring, a sealing glue, etc.

The first part 12 and the second part 13 may be in various shapes, such as a cuboid, a cylinder, etc. The first part 12 may be of a hollow structure with one side open, the second part 13 also may be of a hollow structure with one side open, and the open side of the second part 13 covers the open side of the first part 12, thus forming the case 10 with a closed space. Without doubt, it is also feasible that the first part 12 is of a hollow structure having an opening 211 at one side, the second part 13 is of a plate-like structure, and the second part 13 covers the open side of the first part 12, thus forming the case 10 having the accommodating space 11.

In the battery 100, there may be one or more battery cells 20. If there are a plurality of battery cells 20, the plurality of battery cells 20 may be connected in series or in parallel or in a mixed manner, wherein the mixed manner refers to that the connection of the plurality of battery cells 20 includes both series connection and parallel connection. The plurality of battery cells 20 can be directly connected together in series, in parallel or in a mixed manner, and then the whole composed of the plurality of battery cells 20 is accommodated in the case 10; without doubt, it is also feasible that the plurality of battery cells 20 are first connected in series or in parallel or in a mixed manner to form a battery module, and then a plurality of battery modules are connected in series or in parallel or in a mixed manner to form a whole and accommodated in the case 10. The battery cells 20 may be cylindrical, flat, cuboid or in other shapes. FIG. 2 exemplarily shows the case in which the battery cells 20 are cylindrical.

In some embodiments, the battery 100 further may include a bus member (not shown in the drawing), and the plurality of battery units 20 may realize electrical connection via the bus member, so as to realize series connection or parallel connection or mixed connection of the plurality of battery units 20.

Figure 3:
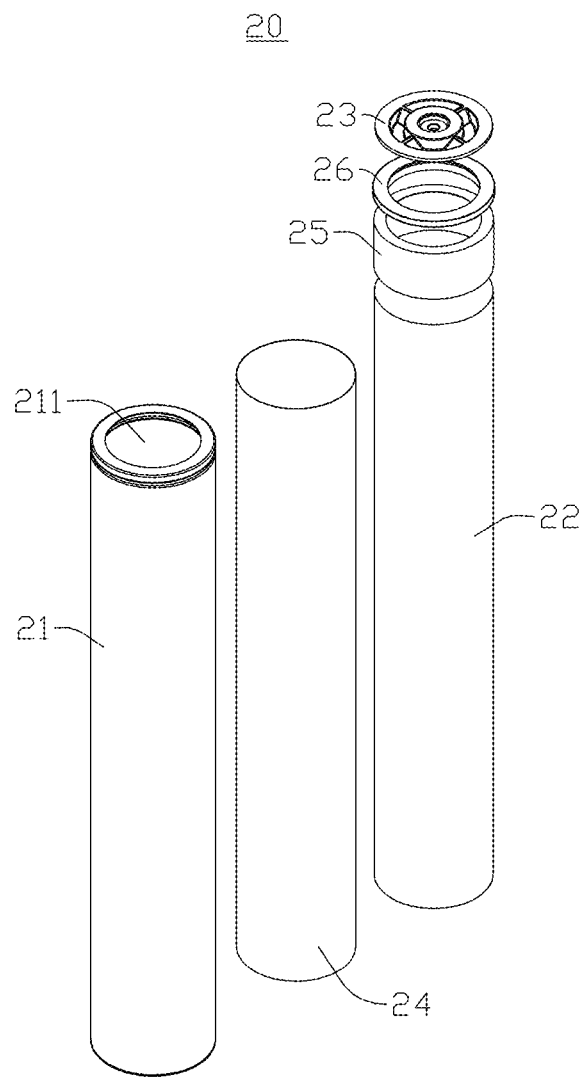
FIG. 3 is an exploded view of a battery cell provided in some embodiments of the present disclosure.

Referring to FIG. 3, FIG. 3 is an exploded view of the battery cell 20 provided in some embodiments of the present disclosure. The battery cell 20 may include a housing 21, an electrode assembly 22, and an end cover 23. The housing 21 has an opening 211, the electrode assembly 22 is accommodated in the housing 21, and the end cover 23 is configured to cover the opening 211.

The housing 21 may be in various shapes, such as a cylinder and a cuboid. The shape of the housing 21 may be determined according to a specific shape of the electrode assembly 22. For example, if the electrode assembly 22 is of a cylindrical structure, the housing 21 may be of a cylindrical structure; and if the electrode assembly 22 is of a cuboid structure, the housing 21 may be of a cuboid structure. FIG. 3 exemplarily shows a case in which the housing 21 and the electrode assembly 22 are cylindrical.

The housing 21 also may be made of various materials, such as copper, iron, aluminum, stainless steel, and aluminum alloy, which is not specially limited in the embodiments of the present disclosure.

The electrode assembly 22 may include a positive electrode plate (not shown in the drawing), a negative electrode plate (not shown in the drawing), and a separator (not shown in the drawing). The electrode assembly 22 may be of a winding structure formed by winding the positive electrode plate, the separator, and the negative electrode plate. The electrode assembly 22 further includes a positive electrode tab (not shown in the drawing) and a negative electrode tab (not shown in the drawing). The positive electrode current collector of the positive electrode plate not coated with a positive active material layer may act as the positive electrode tab, and the negative electrode current collector of the negative electrode plate not coated with a negative active material layer may act as the negative electrode tab.

The end cover 23 is configured to cap the opening 211 of the housing 21, so as to form a closed accommodating chamber configured to accommodate the electrode assembly 22. The accommodating chamber is further configured to accommodate an electrolyte, for example, an electrolytic solution. The end cover 23 acts as a component for outputting electric energy of the electrode assembly 22, an electrode terminal in the end cover 23 is used to be electrically connected to the electrode assembly 22, that is, the electrode terminal is electrically connected to the tab of the electrode assembly 22, for example, the electrode terminal is connected to the tab through the current collector (not shown in the drawing), so as to realize the electrical connection between the electrode terminal and the tab.

The end cover 23 is configured to cover the opening 211 of the housing 21. The end cover 23 may be in various shapes, such as a circular shape and a rectangular shape. The shape of the end cover 23 depends on shapes of the housing 21 and the opening 211 of the housing 21, and if the housing 21 is of a cylindrical structure, a circular end cover 23 can be selected; and if the housing 21 is of a cuboid structure, a circular end cover 23 may be selected. FIG. 3 exemplarily shows a case where the end cover 23 is circular.

It should be noted that, the housing 21 may have one or two openings 211. If the housing 21 has one opening 211, there also may be one end cover 23, then two electrode terminals may be provided in the end cover 23, the two electrode terminals are respectively configured to be electrically connected to the positive electrode tab and the negative electrode tab of the electrode assembly 22, and the two electrode terminals in the end cover 23 are a positive electrode terminal and a negative electrode terminal, respectively. As shown in FIG. 3, the housing 21 has one opening 211, the opening 211 is provided at one end of the housing 21 in an axial direction, and there is also one end cover 23. In this structure, one electrode terminal may be provided on the end cover 23, and the electrode terminal is configured to be electrically connected to one of the positive electrode tab and the negative electrode tab, the other of the positive electrode tab and the negative electrode tab is configured to be electrically connected to the housing 21, and the end cover 23 is in insulated connection with the housing 21, then the electric energy of the electrode assembly 22 is output through the electrode terminal on the end cover 23 and the housing 21, respectively. If the battery cell 20 has only one end cover 23, the end cover 23 also may be provided with two electrode terminals, and the two electrode terminals are configured to be electrically connected to the positive electrode tab and the negative electrode tab of the electrode assembly 22, respectively.

In some embodiments, if the housing 21 has two openings 211, for example, the two openings 211 are provided at two opposite sides of the housing 21, there also may be two end covers 23, and the two end covers 23 respectively cover the two openings 211 of the housing 21. In this case, the electrode terminal of one of the two end covers 23 may be a positive electrode terminal, configured to be electrically connected to the positive electrode tab of the electrode assembly 22; the electrode terminal of the other of the two end covers 23 is a negative electrode terminal, configured to be electrically connected to the negative electrode plate of the electrode assembly 22. The two end covers 23 may be of the same or different structures.

In some embodiments, the electrode assembly 22 includes a main body portion 221 and a first tab 222, and along the axial direction of the electrode assembly 22, the first tab 222 is connected to one end of the main body portion 221. As shown in FIG. 3, the battery cell 20 further includes a protective component 24, the protective component 24 is provided between an outer circumferential wall of the main body portion 221 and an inner circumferential wall of the housing 21, and the protective component 24 is configured to insulate and isolate the main body portion 221 and the housing 21. In some embodiments, the protective component 24 may be of a sleeve structure, the protective component 24 and the electrode assembly 22 are coaxially arranged, the protective component 24 may be provided in a manner of surrounding the outer circumferential wall of the main body portion 221 of the electrode assembly 22, and exemplarily, the protective component 24 is a blue glue adhered to an outer circumferential surface of the main body portion 221. In some embodiments, the protective component 24 further may be fixed to an inner circumferential wall of the housing 21. The first tab 222 may be a positive electrode tab or a negative electrode tab.

In some embodiments, the electrode assembly 22 further includes a second tab 223 having a polarity opposite to that of the first tab 222, and the first tab 222 and the second tab 223 are connected to two ends of the main body portion 221 in the axial direction, respectively. In some other embodiments, the first tab 222 and the second tab 223 may be connected to the same end of the main body portion 221 in the axial direction.

Figure 4:
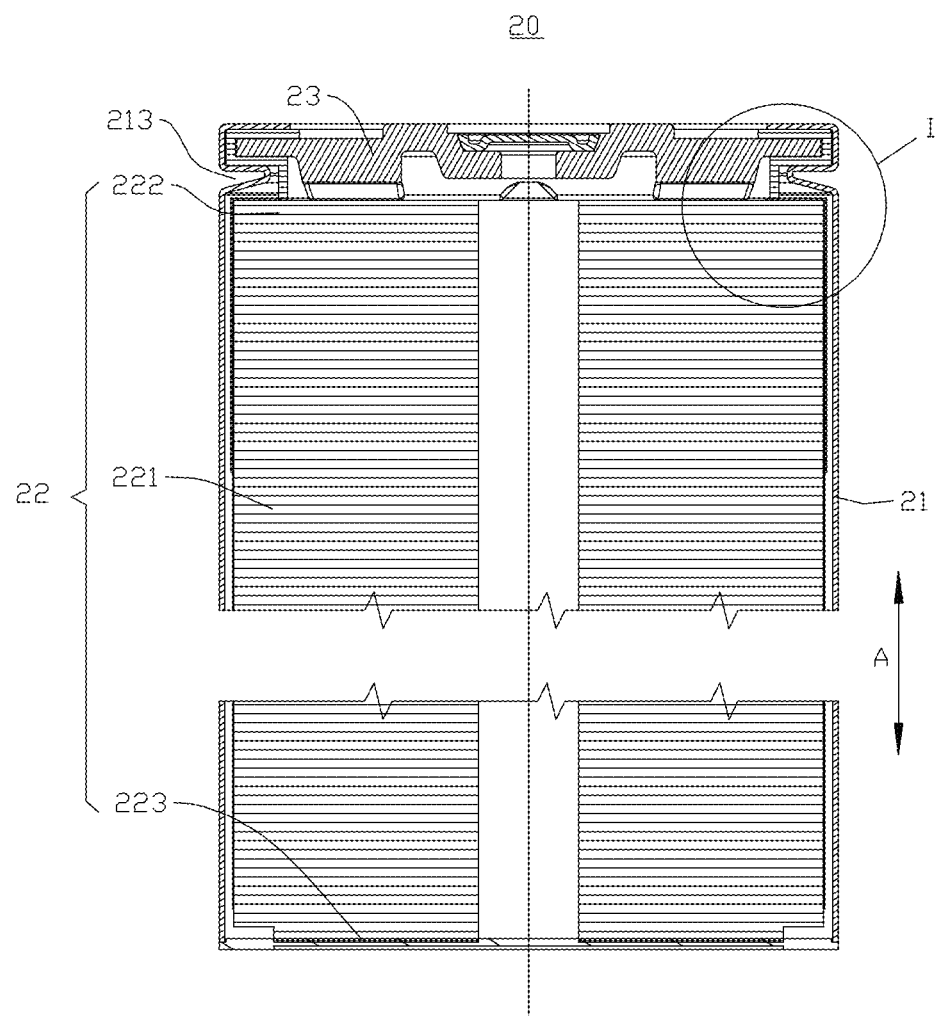
FIG. 4 is a sectional view of the battery cell provided in some embodiments of the present disclosure.
Figure 5:
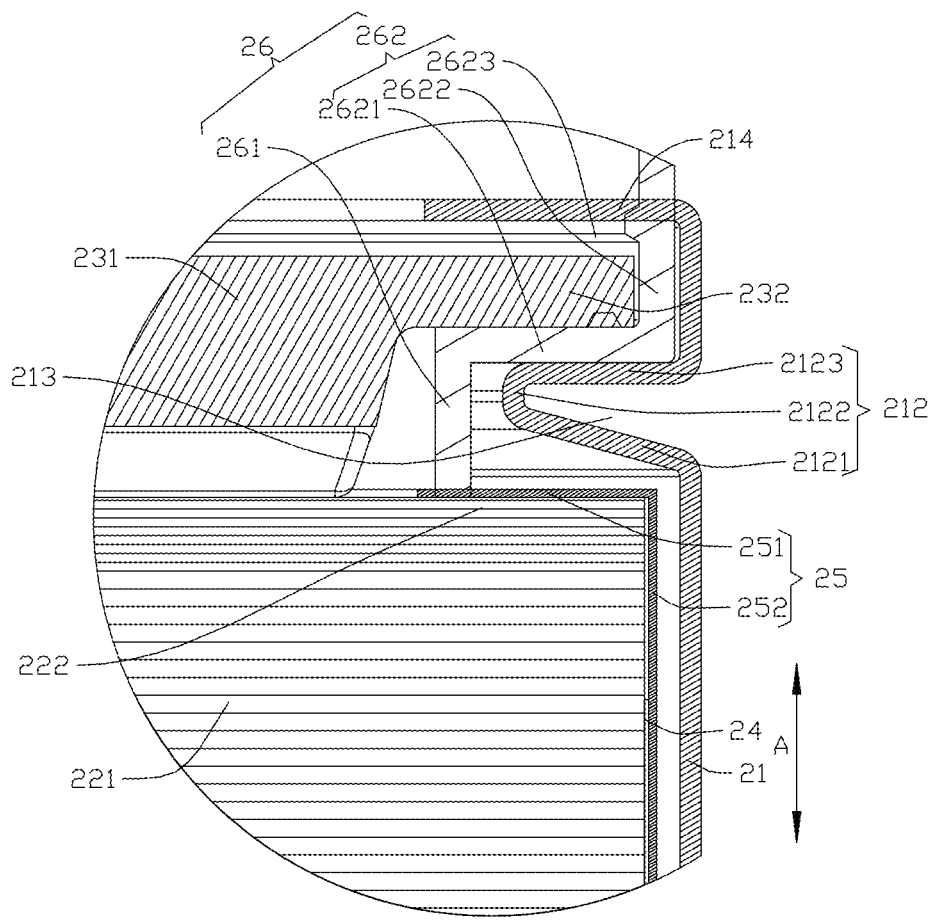
FIG. 5 is an enlarged view of a part I in FIG. 4.

In some embodiments, referring to FIG. 4 and FIG. 5 in combination, FIG. 4 is a sectional view of the battery cell 20 provided in some embodiments of the present disclosure, and FIG. 5 is an enlarged view of a part I in FIG. 4. The battery cell 20 includes the electrode assembly 22, the housing 21, the end cover 23, and a first insulation member 25. The electrode assembly 22 includes a first tab 222. The housing 21 is configured to accommodate the electrode assembly 22, the housing 21 has an opening 211, and a first limiting portion 212 is formed on the inner circumferential wall of the housing 21. The end cover 23 is configured to cover the opening 211, and in the thickness direction A of the end cover, the first limiting portion 212 is configured to limit the movement of the end cover 23 in a direction towards the electrode assembly 22. The first insulation member 25 is at least partially provided between the first tab 222 and the first limiting portion 212, so that the first tab 222 is insulated and isolated from the first limiting portion 212.

In the thickness direction A of the end cover, at least a part of the first insulation member 25 is provided between the first tab 222 and the first limiting portion 212, so as to insulate and isolate the first tab 222 from the first limiting portion 212, and reduce the risk of safety problem caused by short circuit inside the battery cell 20 due to electrical connection formed between the first tab 222 and the first limiting portion 212 caused by contact of the first tab 222 with the first limiting portion 212 as the first tab 222 becomes loose towards the end cover 23.

Regarding the thickness direction A of the end cover mentioned in the embodiments of the present disclosure, if the end cover 23 is of a circular structure, the thickness direction A of the end cover is also the axial direction of the end cover 23, and the thickness direction A of the end cover is also the axial direction of the electrode assembly 22.

In some embodiments, as shown in FIG. 5, a first concave portion 213 recessed inward from an outer circumferential wall of the housing 21 is formed on the housing 21, and a first limiting portion 212 protruding from the inner circumferential wall of the housing 21 is formed at a position of the housing 21 corresponding to the first concave portion 213. Forming the first limiting portion 212 on the inner wall of the housing 21 is relatively difficult to process, while forming the first concave portion 213 on the outer circumferential wall of the housing 21 is less difficult than forming the first limiting portion 212 directly on the inner circumferential wall of the housing 21, therefore, the difficulty in shaping the first limiting portion 212 is reduced by forming the first limiting portion 212 that protrudes from the inner circumferential wall of the housing 21 at a position of the housing 21 corresponding to the first concave portion 213. Besides, by forming the first limiting portion 212 at the position of the inner circumferential wall of the housing 21 corresponding to the first concave portion 213 in the process of forming the first concave portion 213 on the outer circumferential wall of the housing 21, the first limiting portion 212 can be formed after the electrode assembly 22 is accommodated in the housing 21, facilitating the mounting of the electrode assembly 22. Without doubt, in some other embodiments, it is also feasible that in cases where the first concave portion 213 is not formed on the outer circumferential wall of the housing 21, the first limiting portion 212 is formed on the inner circumferential wall of the housing 21.

The first limiting portion 212 includes a first connecting section 2121, a second connecting section 2122, and a third connecting section 2123 connected in sequence, wherein an end of the first connecting section 2121 facing away from the second connecting section 2122 is connected to the housing 21, and an end of the third connecting section 2123 facing away from the second connecting section 2122 is connected to the housing 21. In the thickness direction A of the end cover, the first connecting section 2121 and the third connecting section 2123 are arranged opposite to each other. An outer surface of the first connecting section 2121, an outer surface of the second connecting section 2122, and an outer surface of the third connecting section 2123 together define the first concave portion 213. In the above, a surface of the first connecting section 2121, a surface of the second connecting section 2122, and a surface of the third connecting section 2123 all refer to exposed surfaces of the first connecting section 2121, the second connecting section 2122, and the third connecting section 2123. The first connecting portion and the second connecting portion are in arc transition, and the second connecting portion and the third connecting portion are in arc transition, so that a connecting position of the first connecting portion and the second connecting portion and a connecting position of the second connecting portion and the third connecting portion are prevented from forming edges to scratch structures inside the housing 21.

In some embodiments, the first concave portion 213 is an annular groove formed on the outer circumferential wall of the housing 21, and correspondingly, the first limiting portion 212 is an annular convex portion formed on the inner circumferential wall of the housing 21, i.e., the first concave portion 213 and the first limiting portion 212 are both of annular structures, so that the first limiting portion 212 can limit movement of the end cover 23 in the direction towards the electrode assembly 22 at any position in the circumferential direction.

In some embodiments, the first concave portion 213 may include a plurality of grooves arranged at intervals along a circumferential direction of the housing 21, a protrusion protruding from the inner circumferential wall of the housing 21 is formed at a position of the housing 21 corresponding to each groove, that is, a plurality of protrusions arranged at intervals are provided on the inner circumferential wall of the housing 21 in a protruding manner, the first limiting portion 212 includes a plurality of protrusions, and the plurality of protrusions jointly limit the movement of the end cover 23 in the direction towards the electrode assembly 22.

The first insulation member 25 may be partially located between the first tab 222 and the first limiting portion 212, and the first insulation member 25 also may be completely located between the first tab 222 and the first limiting portion 212.

In some embodiments, the first tab 222 protrudes from one end of the main body portion 221 facing the end cover 23, the first insulation member 25 includes a second insulator 251 and a third insulator 252, the second insulator 251 is provided between the first tab 222 and the first limiting portion 212, the third insulator 252 is connected to the second insulator 251, and the third insulator 252 is provided in a manner of surrounding an outer periphery of the main body portion 221, so as to separate the main body portion 221 and the housing 21. That is, in the thickness direction A of the end cover, the second insulator 251 of the first insulation member 25 is located between the first tab 222 and the first limiting portion 212. The second insulator 251 is provided between the first tab 222 and the first limiting portion 212, so that the first tab 222 is insulated and isolated from the first limiting portion 212. The third insulator 252 may be of a sleeve structure, the third insulator 252 is connected to the second insulator 251 and provided in a manner of surrounding the outer periphery of the main body portion 221, so as to insulate and isolate the main body portion 221 and the housing 21, and prevent short circuit inside the battery cell 20, moreover, the third insulator 252 is connected to the second insulator 251 and provided in a manner of surrounding the outer periphery of the main body portion 221, then it is convenient to mount and fix the first insulation member 25.

In some embodiments, in cases where the protective component 24 is provided in a manner of surrounding the outer circumferential wall of the main body portion 221, the protective component 24 and the third insulator 252 may be coaxially arranged, the third insulator 252 may be provided in a manner of surrounding an outer periphery of the protective component 24, or in the thickness direction A of the end cover, and one end of the third insulator 252 facing away from the second insulator 251 abuts one end of the protective component 24 facing the end cover 23, or the protective component 24 is provided in a manner of surrounding an outer periphery of the third insulator 252.

In some embodiments, the third insulator 252 and the second insulator 251 are of an integrally formed structure, facilitating the manufacturing of the first insulation member 25, and being capable of improving the structural strength of the first insulation member 25. In some other embodiments, the first insulation member 25 and the protective component 24 also may be of an integrally formed structure.

Without doubt, in some other embodiments, the first insulation member 25 may only include the second insulator 251, and the second insulator 251 is completely located between the first tab 222 and the first limiting portion 212, that is, the first insulation member 25 is completely located between the first tab 222 and the first limiting portion 212.

In some embodiments, with continued reference to FIG. 5, the first insulation member 25 is attached to an end surface of the first tab 222 facing the end cover 23. Specifically, the second insulator 251 is attached to the end surface of the first tab 222 facing the end cover 23, so that the first insulation member 25 always forms insulation and isolation between the first tab 222 and the first limiting portion 212. In the above, attachment of the first insulation member 25 to the first tab 222 may be fixation of the first insulation member 25 on the end surface of the first tab 222 facing the end cover 23 in a manner such as bonding, or contact of the first insulation member 25 with the end surface of the first tab 222 facing the end cover 23.

In some embodiments, the first insulation member 25 further may be attached to the surface of the first limiting portion 212 facing the first tab 222. For example, the second insulator 251 of the first insulation member 25 is attached to the surface of the first limiting portion 212 facing the first tab 222, and the third insulator 252 is provided in a manner of surrounding the outer periphery of the main body portion 221. Attachment of the first insulation member 25 to the surface of the first limiting portion facing the first tab 222 may be fixation of the first insulation member 25 to the surface of the first limiting portion 212 facing the first tab 222 in a manner such as bonding, or contact of the first insulation member 25 with the surface of the first limiting portion 212 facing the first tab 222 or fixation of the first insulation member 25 to the surface of the first limiting portion 212 facing the first tab 222.

In some embodiments, in the thickness direction A of the end cover, a gap exists between the second insulator 251 of the first insulation member 25 and the first limiting portion 212 and between the second insulator 251 of the first insulation member 25 and the first tab 222, that is, the second insulator 251 is neither in contact with the first limiting portion 212 nor in contact with the end surface of the first tab 222 facing the end cover 23.

The first insulation member 25 may be an insulating material such as tab glue paper.

In some embodiments, the battery cell 20 further includes a second insulation member 26, the second insulation member 26 is configured to isolate the end cover 23 from the housing 21, the second insulation member 26 includes an abutment body 261 extending in the direction towards the electrode assembly 22, and the abutment body 261 is configured to abut against the first insulation member 25, so that at least a part of the first insulation member 25 is held between the first tab 222 and the first limiting portion 212.

With this structure, the abutment of the abutment body 261 of the second insulation member 26 against the first insulation member 25 can make at least a part of the first insulation member 25 to be held between the first tab 222 and the first limiting portion 212, so that the first tab 222 and the first limiting portion 212 are insulated and isolated by the first insulation member 25, reducing the risk that the first tab 222 cannot be insulated and isolated from the first limiting portion caused by movement of the first insulation member 25 between the first tab 222 and the first limiting portion 212.

In some embodiments, in the thickness direction A of the end cover, the abutment body 261 exceeds the first limiting portion 212 in the direction facing the electrode assembly 22. With this structure, when the abutment body 261 abuts against the first insulation member 25, a gap can always exist between the first insulation member 25 and the first limiting portion 212, so that there is a gap between the first tab 222 and the first limiting portion 212 in the thickness direction, further reducing the risk of contact between the first tab 222 and the first limiting portion 212.

It should be noted that the abutment body 261 exceeding the first limiting portion 212 in the direction facing the electrode assembly 22 refers to that, in the thickness direction A of the end cover, a distance between an end surface of the abutment body 261 closest to the first tab 222 and the first tab 222 is less than a distance between a surface of the first limiting portion 212 closest to the first tab 222 and the first tab 222.

In some embodiments, the abutment body 261 is configured to abut against the first insulator 262 and tightly compress the first insulator 262 on the end surface of the first tab 222 facing the end cover 23, so that the abutment body 261 not only can reduce the possibility of loosening the first tab 222 towards the end cover 23, but also can prevent the first insulation member 25 from being separated from between the first tab 222 and the first limiting portion 212.

Especially in cases where the first insulation member 25 includes the second insulator 251 and the third insulator 252, the abutment body 261 abuts against the second insulator 251 and tightly compresses the second abutment body 261 on the end surface of the first tab 222 facing the end cover 23, and as the third insulator 252 is provided in a manner of surrounding the outer periphery of the main body portion 221, when the electrode assembly 22 expands, the third insulator 252 may be deformed, so that the third insulator 252 has a certain pulling force to the second insulator 251, and there is a risk of pulling the second insulator 251 out from between the first tab 222 and the first limiting portion 212, therefore, as the abutment body 261 of the second insulation member 26 abuts against the second insulator 251 and the second insulator 251 is tightly compressed on the end surface of the first tab 222 facing the end cover 23, the risk that the second insulator 251 is removed from between the first tab 222 and the first limiting portion 212 under the effect of the pulling force of the third insulator 252 can be reduced.

In some embodiments, the abutment body 261 is of an annular structure, so that the abutment body 261 abuts against the first insulation member 25 at any position in the circumferential direction, which can increase an abutment area between the abutment body 261 and the first insulation member 25, improve the abutment stability, and ensure the effectiveness of the first insulation member 25 in insulating and isolating the first tab 222 and the first limiting portion 212.

In some embodiments, the abutment body 261 further may include a plurality of abutment portions arranged at intervals around an axis of the electrode assembly, and each abutment portion is configured to abut against the first insulation member 25, so that at least a part of the first insulation member 25 is held between the first tab 222 and the first limiting portion 212.

In some embodiments, with continued reference to FIG. 5, the second insulation member 26 further includes a first insulator 262 connected to the abutment body 261, wherein the first insulator 262 is configured to isolate the end cover 23 and the housing 21, and the abutment body 261 extends from the first insulator 262 in the direction towards the electrode assembly 22, so as to abut against the first insulation member 25.

The abutment body 261 extends in the direction towards the electrode assembly 22, so that an abutment force of the abutment portion against the first insulation member 25 is perpendicular to a plane where the first tab 222 is located, the abutment against the first insulation member 25 is more reliable, moreover, as the abutment body 261 extends in the direction towards the electrode assembly 22, an extending path of the abutment body 261 is the shortest, so that the abutment portion occupies the smallest space inside the battery cell 20.

In some embodiments, the first insulator 262 includes a first insulation portion 2621 and a second insulation portion 2622 that are connected; the end cover 23 includes a body portion 231 and an extension portion 232 provided along an edge of the body portion 231, the second insulation portion 2622 is located between an outer circumferential wall of the extension portion 232 and the inner circumferential wall of the housing 21, and in the thickness direction A of the end cover, the first insulation portion 2621 is located between the first limiting portion 212 and the extension portion 232, and the abutment body 261 is connected to the first insulation portion 2621. With this structure, the second insulation member 26 not only can realize the insulation and isolation between the end cover 23 and the first limiting portion 212, but also can realize the insulation between the end cover 23 and the housing 21.

In some embodiments, the first insulator 262 further includes a third insulation portion 2623; the third insulation portion 2623 is connected to the second insulation portion 2622, and in the thickness direction A of the end cover, the first insulation portion 2621 and the third insulation portion 2623 are located at two sides of the end cover 23, respectively. The third insulation portion 2623 can form insulated protection on a side of the end cover facing away from the first insulation portion 2621 in the thickness direction A, further reducing the risk of short circuit inside the battery cell 20.

In some embodiments, the housing 21 has a second limiting portion 214; in the thickness direction A of the end cover, the third insulation portion 2623 is located between the extension portion 232 and the second limiting portion 214, and the second limiting portion 214 and the first limiting portion 212 are configured to jointly limit the movement of the end cover 23 relative to the housing 21 in the thickness direction A of the end cover. The second limiting portion 214 and the first limiting portion 212 cooperate to jointly limit the movement of the end cover 23 relative to the housing 21 in the thickness direction A of the end cover, so that the end cover 23 and the housing 21 maintain a stable connection relationship.

In some embodiments, the second limiting portion 214 is connected to the housing 21, and if the second limiting portion 214 is a conductor, the second limiting portion 214 may act as an electrode terminal of the battery cell 20.

In some embodiments, the second limiting portion 214 is a flanging structure of the housing 21 folded inwards at the position of the opening 211, that is, the second limiting portion 214 is a part of the housing 21, so that the second limiting portion 214 can stably limit the end cover 23 on the side of the end cover 23 facing away from the electrode assembly 22. Moreover, as the second limiting portion 214 is a part of the housing 21, the connection relationship of the housing 21 also can be reduced, thus improving the structural strength of the housing 21. With such structure, the second limiting portion 214 can act as an electrode terminal of the battery cell 20.

The second limiting portion 214 may be of an annular structure, so that the second limiting portion 214 can limit the movement of the end cover 23 in the direction facing away from the electrode assembly 22 at any position in the circumferential direction.

In some embodiments, the battery cell 20 further includes a sealing member, and the end cover 23 is in sealed connection with the housing 21 through the sealing member. The configuration of the sealing member makes the end cover 23, the housing 21, and the sealing member jointly form a closed space for accommodating the electrode assembly 22 and the electrolyte, and reduces the risk of liquid leakage.

Taking the energy density of the battery 100 into consideration, in some embodiments, the sealing member is the second insulation member 26, so that the second insulation member 26 not only functions to insulate and isolate the end cover 23 from the housing 21, but also can have a sealing effect between the end cover 23 and the housing 21, then it is unnecessary to additionally provide a sealing member between the end cover 23 and the housing 21, thus reducing occupation of the internal space of the housing 21, and facilitating improving the energy density.

Without doubt, other sealing structures further may be provided between the end cover 23 and the housing 21 according to actual needs.

Figure 6:
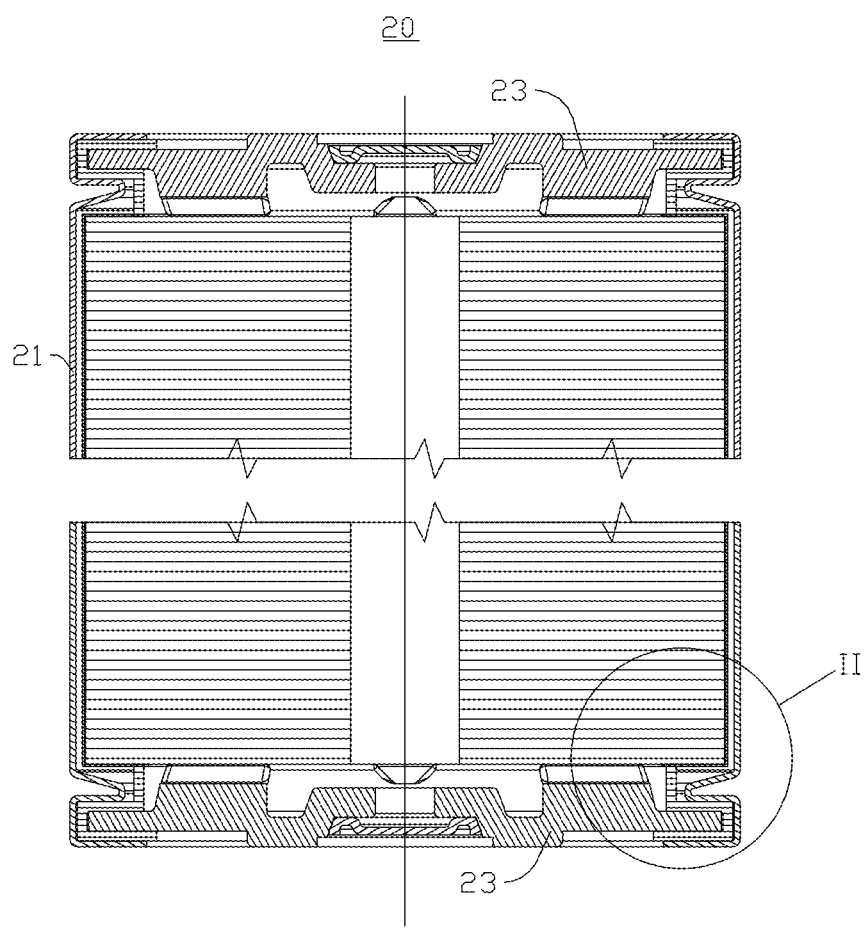
FIG. 6 is a sectional view of the battery cell provided in some other embodiments of the present disclosure.
Figure 7:
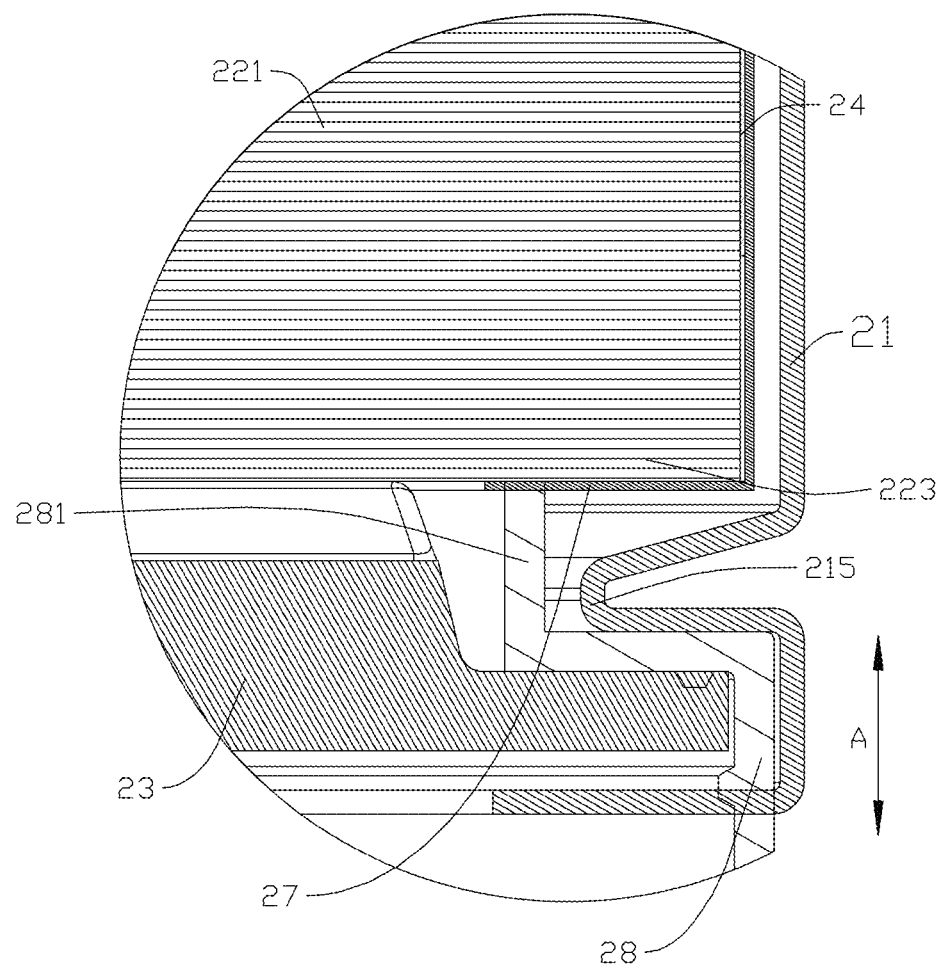
FIG. 7 is an enlarged view of a part II in FIG. 6.

In some embodiments, the electrode assembly 22 further includes a second tab 222, wherein the second tab 223 has a polarity opposite to that of the first tab 222, and the first tab 222 and the second tab 223 protrude from two ends of the main body portion 221 in the axial direction, respectively. As shown in FIG. 6 and FIG. 7, FIG. 6 is a sectional view of the battery cell 20 provided in some other embodiments of the present disclosure, and FIG. 7 is an enlarged view of a part II in FIG. 6. The housing 21 has two openings 211, and the two openings 211 are provided at two opposite sides of the housing 21. There are also two end covers 23, and the two end covers 23 respectively cover the two openings 211 of the housing 21. An electrode terminal of one of the two end covers 23 is configured to be electrically connected to the first tab 222; and an electrode terminal of the other of the two end covers 23 is configured to be electrically connected to the second tab 223. The two end covers 23 may be of the same or different structures. A third limiting portion 215 is formed on the inner circumferential wall of the housing 21. In the thickness direction A of the end cover, the third limiting portion 215 is configured to limit the movement of the end cover 23 in the direction facing the electrode assembly 22.

The battery cell 20 further includes a third insulation member 27, and the third insulation member 27 is at least partially provided between the second tab 223 and the third limiting portion 215, so as to insulate and isolate the second tab 223 from the third limiting portion 215, and reduce the risk of safety problem caused by short circuit inside the battery cell 20 due to electrical connection formed between the second tab 223 and the third limiting portion 215 caused by contact of the second tab 223 with the third limiting portion 215 as the second tab 223 becomes loose towards the end cover 23.

In the above, reference can be made to the first insulation member 25 for the structure and the arrangement manner of the third insulation member 27, and reference can be made to the first limiting portion 212 for the structure and the arrangement manner of the third limiting portion 215, which are not repeated herein.

The battery cell 20 further includes a fourth insulation member 28, the fourth insulation member 28 is configured to isolate the end cover 23 from the housing 21, the fourth insulation member 28 includes an abutment body 281 extending in the direction towards the electrode assembly 22, and the abutment body 281 is configured to abut against the third insulation member 27, so that at least a part of the third insulation member 27 is held between the second tab 223 and the third limiting portion 215, thus reducing the risk that the second tab 223 and the third limiting portion 215 cannot be insulated and isolated due to the movement of the third insulation member 27 between the second tab 223 and the third limiting portion 215.

Figure 8:
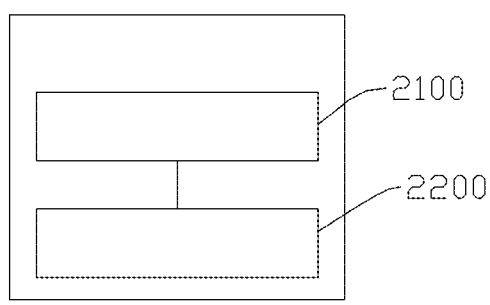
FIG. 8 is a structural diagram of a device for manufacturing a battery cell provided in some embodiments of the present disclosure.

As shown in FIG. 8, FIG. 8 is a structural diagram of a device 2000 for manufacturing a battery cell provided in some embodiments of the present disclosure. Some embodiments of the present disclosure further provide the device 2000 for manufacturing a battery cell, including a providing apparatus 2100 and an assembling apparatus 2200. The providing apparatus 2100 is configured to provide an electrode assembly 22, a housing 21, an end cover 23, and a first insulation member 25. The electrode assembly 22 includes a first tab 222, the housing 21 has an opening 211, a first limiting portion 212 is formed on an inner circumferential wall of the housing 21, the end cover 23 is configured to cover the opening 211, and in a thickness direction A of the end cover, the first limiting portion 212 is configured to limit movement of the end cover 23 in a direction towards the electrode assembly 22. The assembling apparatus 2200 is configured to assemble the electrode assembly 22, the housing 21, the end cover 23, and the first insulation member 25, so that the housing 21 accommodates the electrode assembly 22, the end cover 23 covers the opening 211, and at least a part of the first insulation member 25 is provided between the first tab 222 and the first limiting portion 212, so as to insulate and isolate the first tab 222 and the first limiting portion 212.

The assembling apparatus 2200 can provide, in the thickness direction A of the end cover, at least a part of the first insulation member 25 between the first tab 222 and the first limiting portion 212, so as to insulate and isolate the first tab 222 from the first limiting portion 212, and reduce the risk of safety problem caused by short circuit inside the battery cell 20 due to electrical connection formed between the first tab 222 and the first limiting portion 212 caused by contact of the first tab 222 with the first limiting portion 212 as the first tab 222 becomes loose towards the end cover 23.

Figure 9:
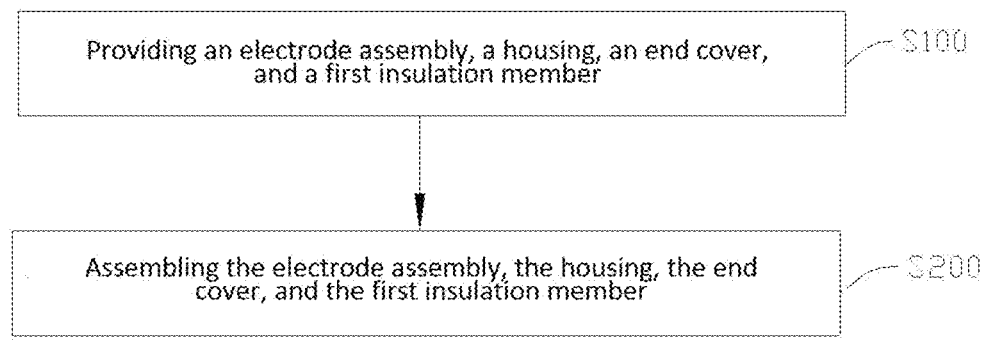
FIG. 9 is a flowchart of a method for manufacturing a battery cell provided in some embodiments of the present disclosure.

As shown in FIG. 9, an embodiment of the present disclosure further provides a method for manufacturing a battery cell 20, wherein the method for manufacturing a battery cell 20 includes:

step S100, providing an electrode assembly 22, a housing 21, an end cover 23, and a first insulation member 25, wherein
the electrode assembly 22 includes a first tab 222, the housing 21 has an opening 211, a first limiting portion 212 is formed on an inner circumferential wall of the housing 21, the end cover 23 is configured to cover the opening 211, and in the thickness direction A of the end cover, the first limiting portion 212 is configured to limit movement of the end cover 23 in a direction towards the electrode assembly 22; and step S200, assembling the electrode assembly 22, the housing 21, the end cover 23, and the first insulation member 25, so that the housing 21 accommodates the electrode assembly 22, the end cover 23 covers the opening 211, and at least a part of the first insulation member 25 is provided between the first tab 222 and the first limiting portion 212, so as to insulate and isolate the first tab 222 and the first limiting portion 212.

In the thickness direction A of the end cover, at least a part of the first insulation member 25 is provided between the first tab 222 and the first limiting portion 212, so as to insulate and isolate the first tab 222 from the first limiting portion 212, and reduce the risk of safety problem caused by short circuit inside the battery cell 20 due to electrical connection formed between the first tab 222 and the first limiting portion 212 caused by contact of the first tab 222 with the first limiting portion 212 as the first tab 222 becomes loose towards the end cover 23.

The above-mentioned are merely for preferred embodiments of the present disclosure and not used to limit the present disclosure. For those skilled in the art, various modifications and changes may be made to the present disclosure. Any modifications, equivalent substitutions, improvements and so on, within the spirit and principle of the present disclosure, should be covered within the scope of protection of the present disclosure.

What is claimed is:

1. A battery cell, comprising:
an electrode assembly comprising a first tab;
a housing configured to accommodate the electrode assembly, wherein the housing has an opening, and a first limiting structure is formed on an inner circumferential wall of the housing;
an end cover configured to cover the opening, wherein in a thickness direction of the end cover, the first limiting structure is configured to limit movement of the end cover in a direction towards the electrode assembly; and
a first insulation structure at least partially provided between the first tab and the first limiting structure, so as to insulate and isolate the first tab from the first limiting structure,
wherein the electrode assembly further comprises a main body structure, and the first tab protrudes from an end of the main body structure facing the end cover;
wherein the first insulation structure further comprises a second insulator and a third insulator, the second insulator is provided between the first tab and the first limiting structure, the third insulator is connected to the second insulator, and the third insulator is provided in a manner of surrounding an outer periphery of the main body structure, so as to separate the main body structure and the housing; and
wherein in the thickness direction of the end cover, a gap is provided between the second insulator of the first insulator and the first limiting structure and between the second insulator of the first insulation structure and the first tab.

2. The battery cell according to claim 1, wherein the battery cell further comprises a second insulation structure, the second insulation structure is configured to isolate the end cover from the housing, the second insulation structure comprises an abutment body extending in the direction towards the electrode assembly, and the abutment body is configured to abut against the first insulation structure, so that at least a part of the first insulation structure is held between the first tab and the first limiting structure.

3. The battery cell according to claim 2, wherein in the thickness direction of the end cover, the abutment body exceeds the first limiting structure in the direction towards the electrode assembly.

4. The battery cell according to claim 2, wherein the abutment body is of an annular structure.

5. The battery cell according to claim 2, wherein the second insulation structure further comprises a first insulator connected to the abutment body, the first insulator is configured to isolate the end cover and the housing, and the abutment body extends from the first insulator in the direction towards the electrode assembly, so as to abut against the first insulation structure.

6. The battery cell according to claim 5, wherein the first insulator comprises a first insulation structure and a second insulation structure that are connected;
the end cover comprises a body structure and an extension structure provided along an edge of the body structure, the second insulation structure is located between an outer circumferential wall of the extension structure and the inner circumferential wall of the housing, and in the thickness direction of the end cover, the first insulation structure is located between the first limiting structure and the extension structure, and the abutment body is connected to the first insulation structure.

7. The battery cell according to claim 6, wherein the first insulator further comprises a third insulation structure; and
the third insulation structure is connected to the second insulation structure, and in the thickness direction of the end cover, the first insulation structure and the third insulation structure are located at two sides of the end cover, respectively.

8. The battery cell according to claim 7, wherein the housing has a second limiting structure; and
in the thickness direction of the end cover, the third insulation structure is located between the extension structure and the second limiting structure, and the second limiting structure and the first limiting structure are configured to jointly limit movement of the end cover relative to the housing in the thickness direction of the end cover.

9. The battery cell according to claim 8, wherein the second limiting structure is a flanging structure of the housing folded inwards at a position of the opening.

10. The battery cell according to claim 2, wherein the battery cell further comprises a sealing structure, and the end cover is in sealed connection with the housing through the sealing structure, optionally the sealing structure is the second insulation member.

11. The battery cell according to claim 1, wherein a first concave structure recessed inward from an outer circumferential wall of the housing is formed on the housing, the first limiting structure protruding from the inner circumferential wall of the housing is formed at a position of the housing corresponding to the first concave structure, and the first concave structure and the first limiting structure are both of annular structures.

12. The battery cell according to claim 1, wherein the third insulator and the second insulator are of an integrally formed structure.

13. A battery, comprising a plurality of battery cells according to claim 1.

14. A power consumption device, comprising the battery according to claim 13.

* * * * *